Nov. 27, 1923

E. L. PETERSON

CONCRETE PIPE JOINT

Filed Aug. 10, 1920

INVENTOR

EARL L. PETERSON

BY

ATTORNEYS

Nov. 27, 1923.

E. L. PETERSON 1,475,867

CONCRETE PIPE JOINT

Filed Aug. 10, 1920

INVENTOR

EARL L. PETERSON

BY

ATTORNEYS

Patented Nov. 27, 1923.

1,475,867

UNITED STATES PATENT OFFICE.

EARL L. PETERSON, OF CORONA, NEW YORK, ASSIGNOR TO UNITED CONCRETE PIPE COMPANY, OF NEW YORK, N. Y., A CORPORATION OF DELAWARE.

CONCRETE-PIPE JOINT.

Application filed August 10, 1920. Serial No. 402,642.

*To all whom it may concern:*

Be it known that I, EARL L. PETERSON, a citizen of the United States of America, residing at Corona, in the county of Queens, Long Island, and State of New York, have invented certain new and useful Improvements in Concrete-Pipe Joints, of which the following is a specification.

My invention relates to pipe joints, and particularly to joints between concrete pipe sections, the object of my invention being to provide a joint of improved character which, in certain types of construction, afford flexibility between the pipe sections.

In the accompanying drawings—

Figure 1:
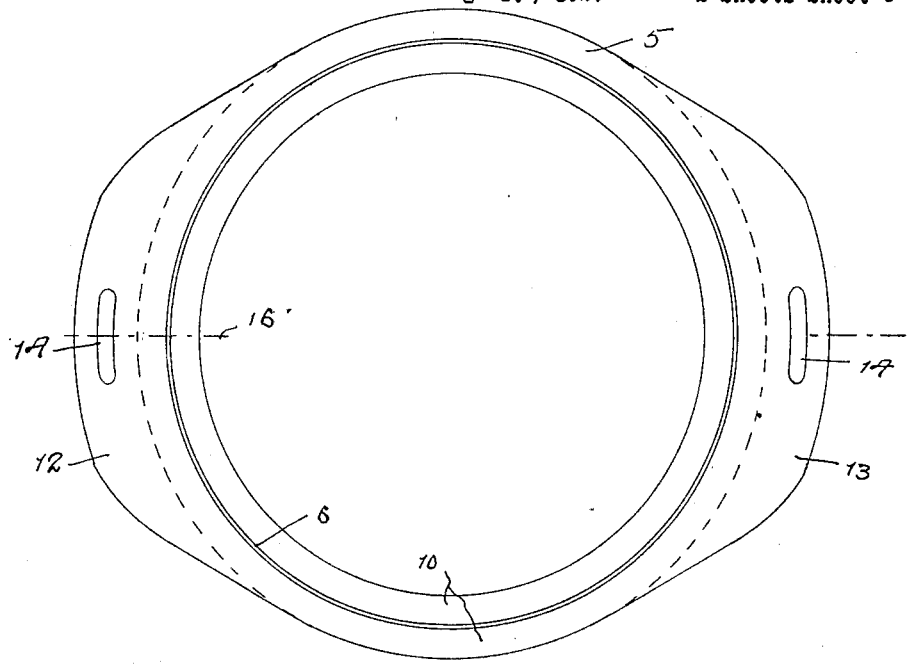
Fig. 1 is an end elevation of a bell end pipe having lateral securing flanges.

In submerged pipe lines, it is desirable to afford a joint between pipe sections which will permit of a certain amount of flexion without rupture incident to the strains imposed upon the line by wave action, tides, etc. The construction shown in Figs. 1 and 2 attains such flexibility, while at the same time maintaining the joint tight within the range of movement permitted between the pipe sections.

Figure 2:
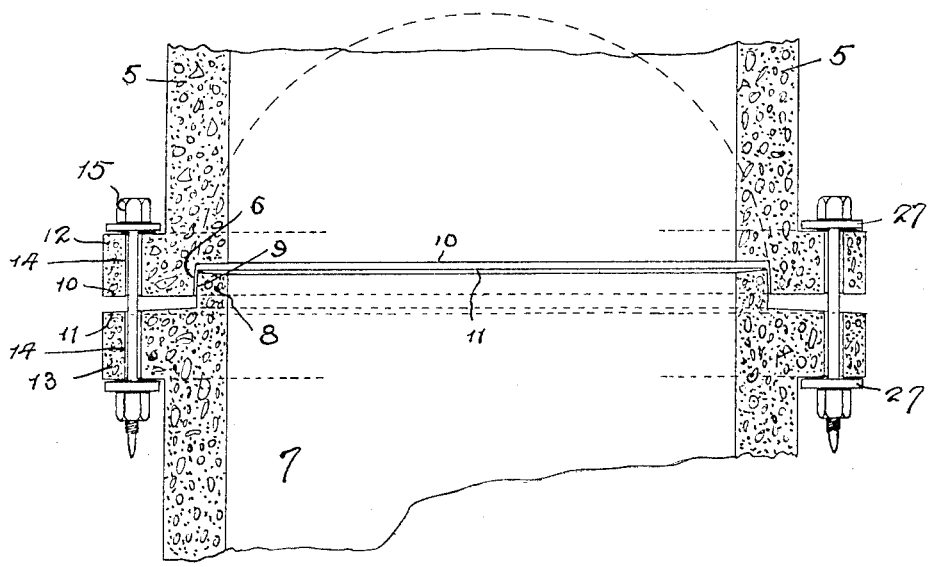
Fig. 2 is a horizontal section through a joint between a pipe of the type shown in Fig. 1 and a co-operating pipe with spigot end adapted to make joint therewith.

As here shown the pipe 5 is recessed to form a bell end, the bearing surface 6 of the bell being formed on a curve after the fashion of a ball joint. The co-operating pipe section 7 has a projecting spigot flange 8, the outer face 9 of which is similarly curved to bear against and make joint with the curved face 6 of the bell of pipe 5. For the sake of illustrating the construction, the surfaces are shown in Fig. 2 as slightly spaced apart. In an actual installation the joint surfaces 6 and 9 meet, while the end faces 10 and 11 of the pipe sections are spaced apart in the closed joint to afford a clearance, which permits predetermined freedom of angular displacement of the sections without parting at the co-operating joint surfaces.

In order to secure the pipe sections together, I provide external flanges 12 and 13 on opposite sides of the pipe ends, and these flanges are slotted at 14 to receive the securing bolts 15. The slots 14 extend a predetermined distance on opposite sides of the spring line 16 of the pipe. In assembling a submerged pipe line, care should be taken to have the center line of the flanges 12 and 13 substantially horizontal, so that the bolts 15 which pass through the holes 14 therein lie substantially on the spring line of the pipe.

When the joint has been made it is obvious that by reason of the ball joint surfaces 6 and 9 of the co-operating pipe ends and the play of the bolts 15 in the slots 14, there is limited freedom of angular displacement while the joint is maintained tight and without rupture of either the bolts 15 or the flanges 12 and 13 through which they pass. When the pipes are flexed upward the bolts 15 rise in the slots 14. When they are flexed downward the bolts move downward in the slots. It will be noted that the slots are formed on a curve co-axial with the pipe, so that as the bolt slides therein no strains are imposed on it or on the flanges except the tensional strains which both are designed to bear, and by which the pipes are held together.

While this construction is of particular value in a submerged pipe line subject to flexion, it is especially valuable in a land installation in which the line is curved either laterally or vertically. Of course when the curve is lateral, the flanges 12 and 13 should be arranged in vertical position.

Figure 3:
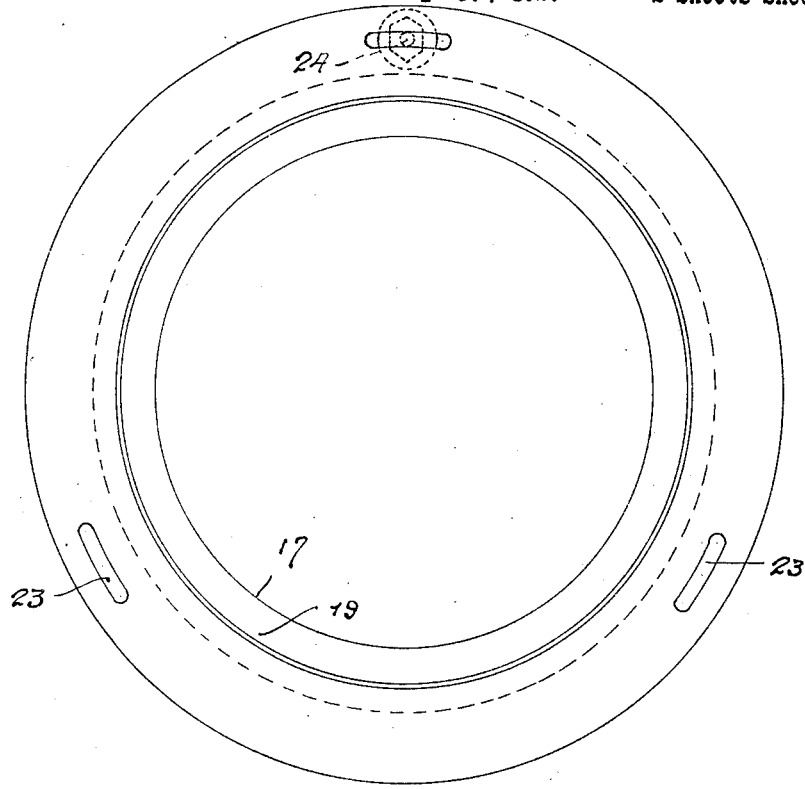
Fig. 3 is an end elevation of a pipe of modified construction.
Figure 4:
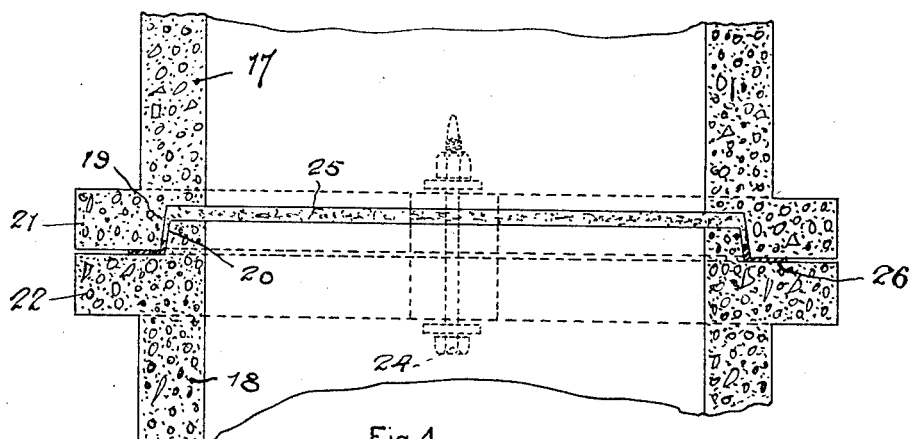
Fig. 4 is a horizontal section through a joint between a pipe of the type shown in Fig. 3, and a co-operating pipe with spigot end adapted to make joint therewith.

In Figs. 3 and 4 I have shown the pipe sections 17 and 18 provided with bell 19 and spigot 20, respectively. The joint surfaces in this construction are frustro conical and not spherical, as in the previous construction. Flexibility, therefore, is not possible at this joint without either opening it or rupturing the union. In order to maintain the joint tight, I provide the pipe ends with annular flanges 21 and 22 respectively, which have a series of arcuate slots 23 formed therein to receive the draw-up bolts 24.

Where the pipe is laid submerged, or partially submerged, as would generally be the case for pipe of this type, it is desirable to pump out the line after it is laid so that the inner face of the joint may be sealed with grouting 25. A temporary seal at the joint may be effected by arranging between the pipe ends, outside the grout-seal area, a packing 26 of any suitable sort. After the bolts have been tightened, the joint is temporarily sealed, so that there is no leakage during the pumping out operation, or during the troweling of the grout 25 into the inner portion of the joint area.

The arcuate form of the bolt slots 23 lessens the relative rotary adjustment of pipes to bring the slots into sufficient register to receive the bolts. There is of course no movement of the bolts in the slots after the pipes are assembled. The strains incident to expansion and contraction may be taken care of by placing beneath the head of the bolt and nut, respectively, heavy spring washers 27, which take up the relative movement between the parts, and prevent rupture of the flanges.

Various modifications of construction will readily occur to those dealing with the problem, and I do not limit my invention to the precise structure shown, which is merely an illustrative embodiment of what I claim as my invention.

I claim—

1. In a concrete pipe joint, co-operating bell and spigot pipe ends having their joint surfaces curved to form a ball joint, external flanges on the respective pipe ends and integral therewith, and draw-up bolts engaging said flanges and located on the same diameter of the pipe, said flanges being slotted to permit the draw-up bolts to work therein on flexion at the joint.

2. In a concrete pipe joint, co-operating ball and spigot pipe ends having their joint surfaces curved to form a ball joint, external flanges on the respective pipe ends and integral therewith, and draw-up bolts engaging said flanges and located on the same diameter of the pipe, said flanges having arcuate slots through which the bolts pass, and in which they are free to work on flexion at the joint.

In testimony whereof I have signed my name to this specification.

EARL L. PETERSON.